United States Patent
Rivlin et al.

(10) Patent No.: US 8,867,313 B1
(45) Date of Patent: Oct. 21, 2014

(54) AUDIO BASED LOCALIZATION

(75) Inventors: Ehud Rivlin, Palo Alto, CA (US); Abhijit Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 619 days.

(21) Appl. No.: 13/179,926

(22) Filed: Jul. 11, 2011

(51) Int. Cl.
*G01S 11/00* (2006.01)

(52) U.S. Cl.
USPC .......................... 367/118; 367/124; 455/456.1

(58) Field of Classification Search
USPC .......................... 367/118, 120, 123, 125, 127; 455/456.1–6
See application file for complete search history.

(56) References Cited

U.S. PATENT DOCUMENTS

| | | | |
|---|---|---|---|
| 6,865,347 B2 * | 3/2005 | Perkins et al. ................ 398/172 |
| 6,947,753 B2 * | 9/2005 | Bayder ...................... 455/456.1 |
| 6,990,419 B2 * | 1/2006 | Ramillon et al. ............... 702/76 |
| 7,920,878 B2 | 4/2011 | Clipsham |
| 7,922,586 B2 | 4/2011 | Heckendorf, III et al. |
| 7,924,160 B1 | 4/2011 | LaPenta et al. |
| 7,929,943 B2 | 4/2011 | Begeja et al. |
| 8,416,120 B2 * | 4/2013 | Kim et al. ........................ 342/59 |
| 2008/0031093 A1 * | 2/2008 | Oura et al. ...................... 367/128 |
| 2009/0231958 A1 * | 9/2009 | Wei et al. ....................... 367/118 |
| 2009/0316529 A1 * | 12/2009 | Huuskonen et al. .......... 367/124 |
| 2010/0110273 A1 * | 5/2010 | Turbahn et al. ............... 348/348 |

* cited by examiner

*Primary Examiner* — Isam Alsomiri
*Assistant Examiner* — Hovhannes Baghdasaryan
(74) *Attorney, Agent, or Firm* — Lerner, David, Littenberg, Krumholz & Mentlik, LLP

(57) ABSTRACT

Methods of and systems for determining a location of a mobile device using transmitted audio signals is provided. In an embodiment, meta data included in the audio signals may also be used. In an embodiment, a characteristic, such as a received signal strength, may be measured to determine the location of the mobile device.

18 Claims, 7 Drawing Sheets

FIG. 6

| Mobile Station Model | Frequency Response Data | | | |
|---|---|---|---|---|
| | 20000 Hz | 21000Hz | 22000Hz | 23000 Hz |
| GC 371S | 0 | -1db | -5db | -6db |
| QT 6541 | 0 | -2db | -4db | -7db |
| N3287 | 1db | 0db | -5db | -6db |

FIG. 7

| Speaker ID | Location | Signal Strength | Frequency | Signal Strength Data |
|---|---|---|---|---|
| 00000001 | 37.4272222 -122.0991666 | 10dB | 21,000 | |
| 00000002 | Conference Room 1 NE corner at ceiling | 10dB | 21,250 | |
| 00000003 | Conference Room 4 | 10dB | 21,500 | |
| 00000004 | 123'6", 70'22', 60'3" | 10dB | Channel 1 | |

AUDIO BASED LOCALIZATION

BACKGROUND

Mobile computing and communication devices are becoming extremely prevalent, and there is great interest in providing location specific services and information to the users of mobile devices. Mobile devices such as smart phones, media players, and personal digital assistants (PDA) often include Global Positioning Satellite (GPS) systems for identifying the device's location. The positions of cellular devices may also be determined using triangulation from cell phone towers. Typically, these systems are used to determine the positions of mobile devices to accuracies on the order of tens or hundreds of meters. These levels of accuracy may not be sufficient for some purposes, and systems such as GPS may not function indoors.

BRIEF SUMMARY

Embodiments described below include methods and systems for employing audio signals to determine the location of a mobile device. According to an embodiment, a method for determining the location of a mobile device may include receiving audio signals at the mobile device, measuring a characteristic of each audio signal, decoding each audio signal to extract respective meta data, and determining a location of the mobile device based on the measured characteristics and at least one of the extracted meta data. Measuring a characteristic may be performed by measuring a received signal strength of each audio signal. The extracted meta data may include data indicative of a location of a speaker that transmitted one of the audio signals.

In another embodiment, a system for determining locations is provided. The system may include speakers configured to generate audio signals and a mobile device. The mobile device may include a receiver that receives at least one of the audio signals and that measures a characteristic of each of the at least one of the audio signals, and a decoder that decodes one or more of the audio signals to extract respective meta data.

BRIEF DESCRIPTION OF THE DRAWINGS/FIGURES

Embodiments are described, by way of example only, with reference to the accompanying drawings. In the drawings, similar reference numbers may indicate identical or functionally similar elements. The drawing in which an element first appears is typically indicated by the leftmost digit or digits in the corresponding reference number.

FIG. 6 illustrates an example data structure for storing characteristics of a mobile device according to an embodiment;

FIG. 7 illustrates an example data structure for storing characteristics of speakers according to an embodiment.

Figure 1:
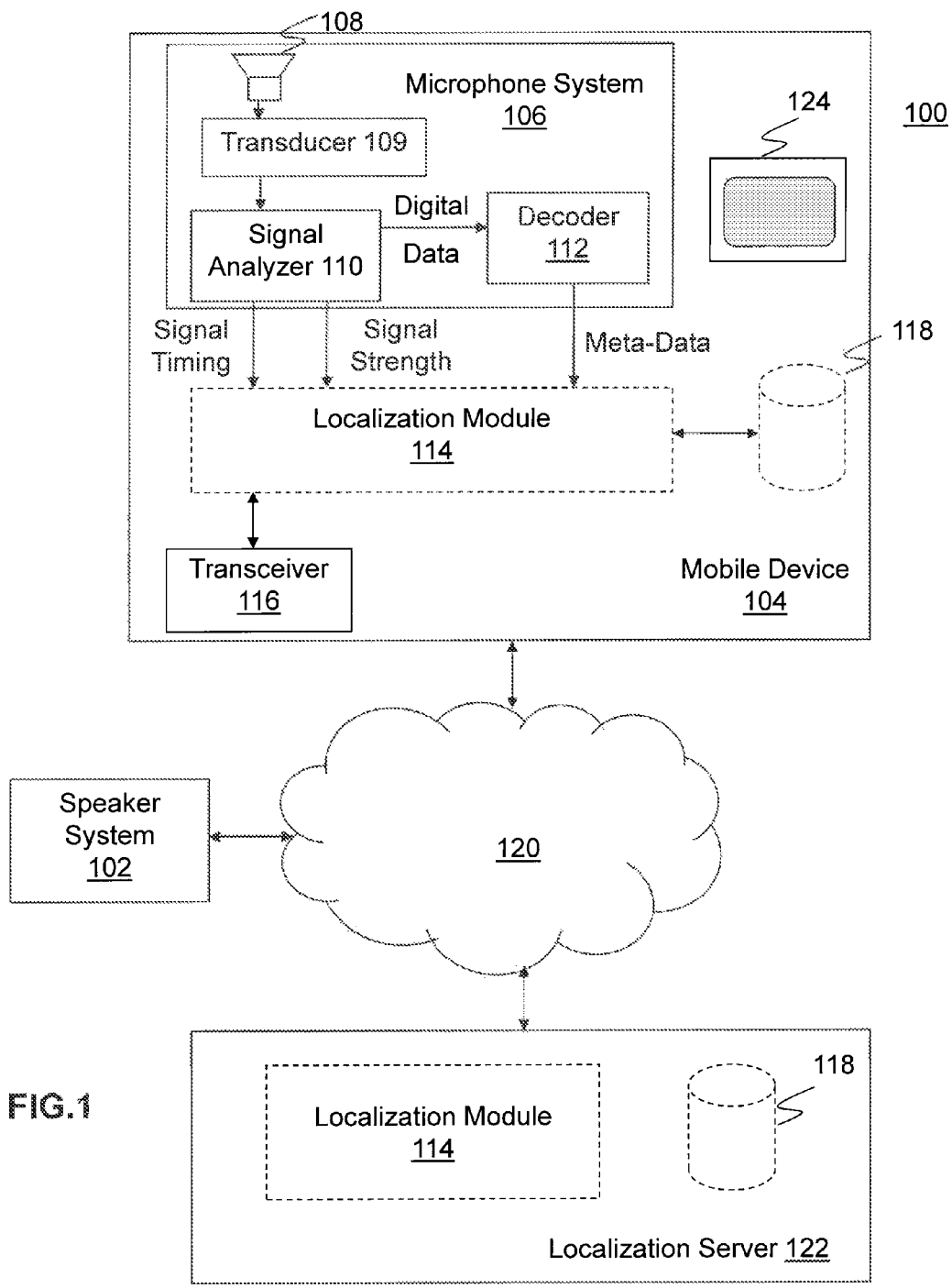
FIG. 1 is a diagram illustrating components of an exemplary system suitable for practicing an embodiment.

The accompanying drawings, which are incorporated herein and form part of the specification, illustrate embodiments and, together with the description, further serve to explain the principles of the invention and to enable a person skilled in the relevant art(s) to make and use the invention.

DETAILED DESCRIPTION

I. Introduction

The location of a mobile device within a facility may be determined using audio signals transmitted from one or more locations within the facility. For example, a user having a smart phone, might be present within an office building. Using the systems and methods described herein, the user's smart phone may display a detailed location for the user within the office building such as "Conference Room 3."

As a further illustrative example, a user might enter a retail establishment with a mobile device such as a personal digital assistant (PDA), notebook computer, or smart phone. Using the systems and methods described herein, the user's mobile device may display a detailed location for the user within the retail establishment such as "Electronics Department" or "Ladies' Shoe Department".

While the present invention is described herein with reference to illustrative embodiments for particular applications, it should be understood that embodiments are not limited thereto. Other embodiments are possible, and modifications may be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, may be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. System Overview

Figure 2:
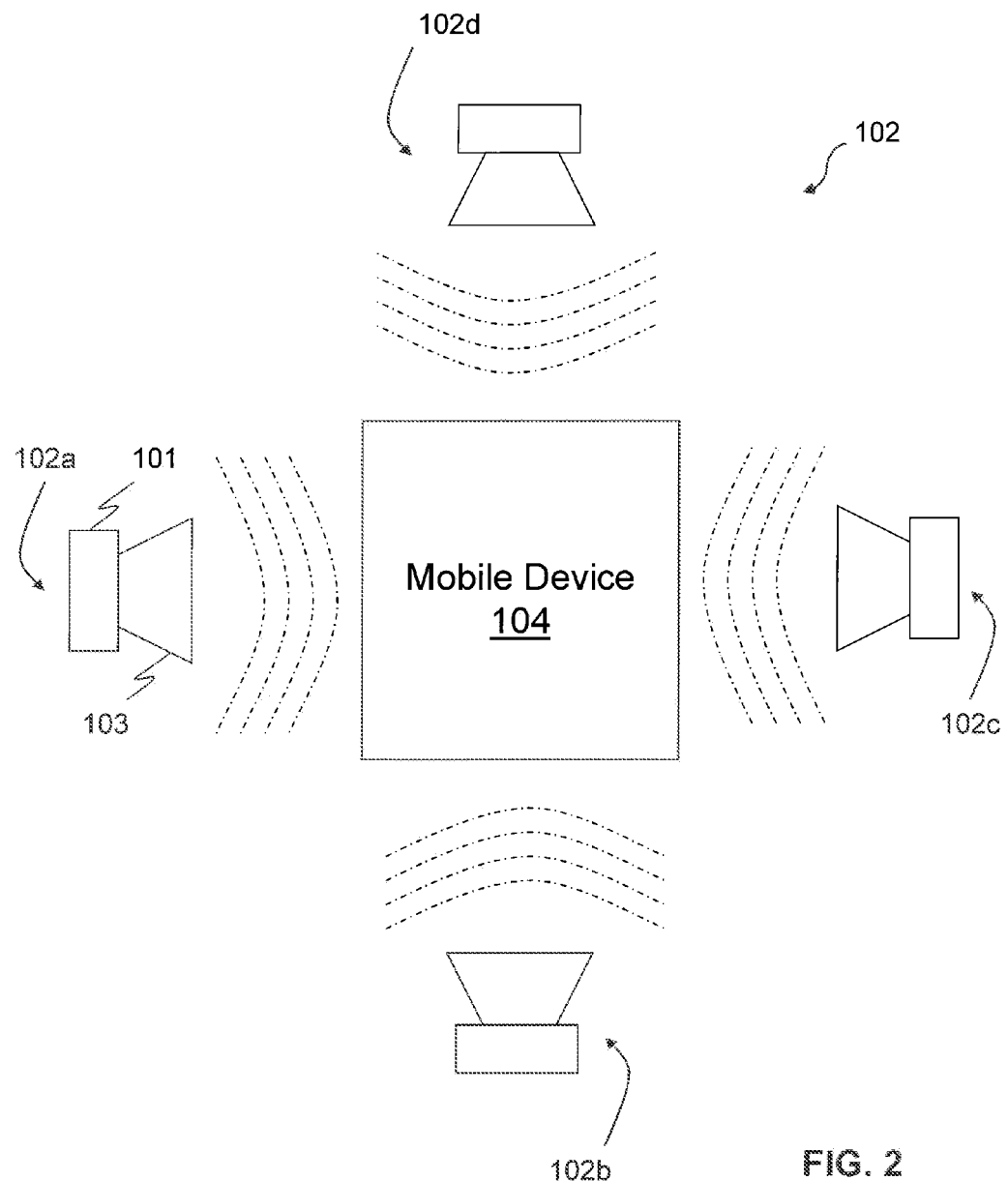
FIG. 2 is a diagram illustrating details of the components of an exemplary system for practicing an embodiment.

FIGS. 1 and 2 illustrate an exemplary location determining system suitable for practicing embodiments. Referring first to FIG. 1, location determining system 100 is an exemplary system for determining the location of mobile device 104. In an embodiment, location determining system 100 may include mobile device 104, a speaker system 102, a localization server 122, and a network 120.

In an embodiment, mobile device 104 includes a microphone system 106 for receiving and processing audio signals. Microphone system 106 includes a microphone 108 that receives audio signals from speaker system 102. Microphone 108 is coupled to a transducer 109 that transduces the received audio signals into representative electronic signals, a signal analyzer 110, and decoder 112. Microphone system 106 may use multiple microphones to improve reception and filter noise.

Signal analyzer 110 receives electrical signals from transducer 109 and converts the electronic signals into digital data. Signal analyzer 110 may also measure attributes of the received signal strength for audio signals received at microphone 108 and may generate output signals that represent the attributes for each audio signal that is recognized by decoder 112 as including meta data. Moreover, signal analyzer 110 may include an analog-to-digital converter (not shown in FIG. 1) that converts the received analog signals into digital signals.

Decoder 112 is configured to decode the digital data received from signal analyzer 110 to recover meta data encoded into the received audio signals.

Location determining system 100 may also include a localization module 114 and a localization database 118. Localization module 114 may calculate locations for the mobile device using various methods. As is shown in FIG. 1, localization module 114 and localization database 118 may be part of mobile device 104, or may alternatively be located in remote localization server 122.

In an embodiment, mobile device 104 may include transceiver 116. Transceiver 116 may receive and transmit data used in embodiments. For example, when components such as localization module 114 and localization database 118 are located remotely, mobile device 104 may communicate with the remote components via transceiver 116 and one or more networks 120.

Speaker system 102 may include one or more speakers for emitting audio signals of a given frequency and signal strength. FIG. 2 shows an embodiment of speaker system 102 that includes speakers 102a, 102b, 102c and 102d. Each of speakers 102a, 102b, 102c, and 102d includes a sound emitting element 103 and one or more speaker driver elements 101. The sound emitting elements generate sound waves from an electrical signal generated by speaker driver element 101.

While four speakers 102a-102d are shown in FIG. 2, it is noted that any number of speakers may be used to practice embodiments. For example, embodiments may determine a location for a mobile device within a facility using a single speaker while other embodiments may employ two, three, or more speakers to determine the location.

Similarly, although only one mobile device 104 is shown in FIGS. 1 and 2, location determining system 100 may serve any number of mobile devices.

Referring again to FIG. 1, network 120 connects location determining system components such as mobile device 104 and speaker system 102 to localization server 122. The network may also connect each of the speakers 102a-102d to other system components. In an embodiment, network 120 may include one or more networks, such as a local area network (LAN), a wide area network (WAN), the Internet, or a combination thereof. The network connects location determining system components such as mobile devices 104 to localization server 122. The network may also connect each of the speakers 102a-102d to other system components. The connections to network 120 may be wireless connections, wired connections, or a connection that includes a combination of wired and wireless links.

As will be described below, localization module 114 may determine locations using a variety of methods. Embodiments may determine locations using information provided to localization module 114, such as one or more of signal strength, frequency, and timing information measured for audio signals received by mobile device 104. Among other of its functions, localization module 114 may control the driver elements 101 of the speakers of speaker system 102 so that the speakers generate audio signals of a given frequency, timing, and audio signal strength. Alternatively, logic to control the generation of the audio signals may be contained in one or more of the speaker driver elements 101.

III. Trilateration Using Audio Signal Strength Measurements

Figure 5:
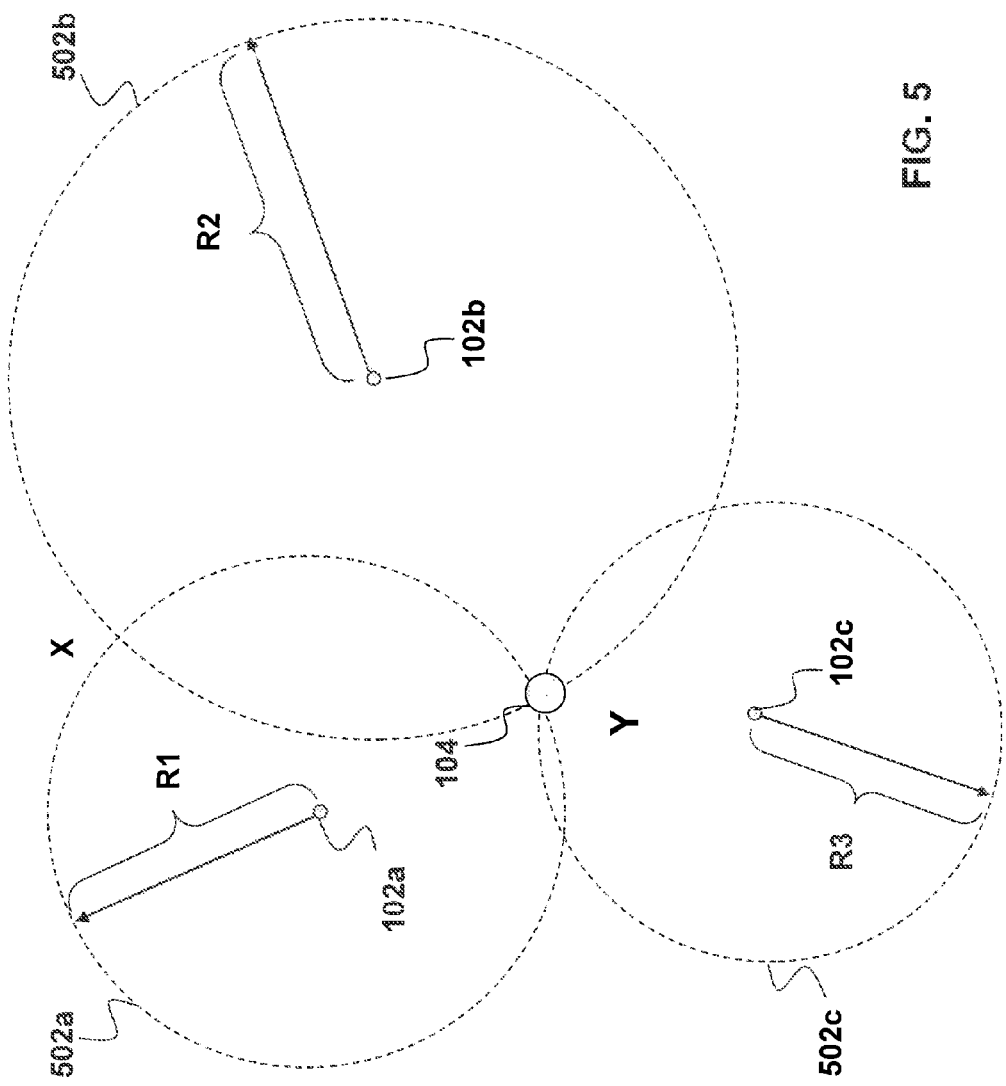
FIG. 5 illustrates an example determination of a receiver location using trilateration according to an embodiment.

FIG. 5 illustrates an example determining the location of a mobile device by trilateration, according to an embodiment. Trilateration is a method of calculating an unknown position using distances measured from one or more known locations to the unknown position. Given the distance between a point whose location is to be determined and a single known location, the location to be determined lies on the surface of a sphere centered at the single known location. For example, given a single distance measurement R1 from speaker 102a, the location of mobile device 104 may be determined to lie somewhere on the surface of sphere 502a. In some cases the location of mobile device 104 as somewhere on the sphere may be sufficient. If a distance from mobile device 104 to a different speaker, such as speaker 102b is measured to be R2, then the location of mobile device 104 may be determined to be on a circle defined by the intersection of spheres 502a and 502b. In some embodiments, determining that mobile device 104 is near the circular intersection region including points X and Y may be sufficiently precise.

If the distance between an additional speaker 102c and mobile device 104 is measured to be R3 as shown in FIG. 5, then the location of mobile device 104 may be calculated to be near point Y, located at the common intersection of the three spheres 502a, 502b, and 502c. Measuring distances between speakers in addition to speakers 102a, 102b, and 102c speakers and mobile device 104 may allows an even more accurate determination the location of mobile device 104.

Embodiments may use signal strength measurements to determine the distances between a mobile device and one or more speakers for use in a trilateration process to determine the location of the mobile device. The distance between a speaker and a mobile device is determined by comparing the audio single strength transmitted at the speaker to the signal strength received at the mobile device.

Figure 4:
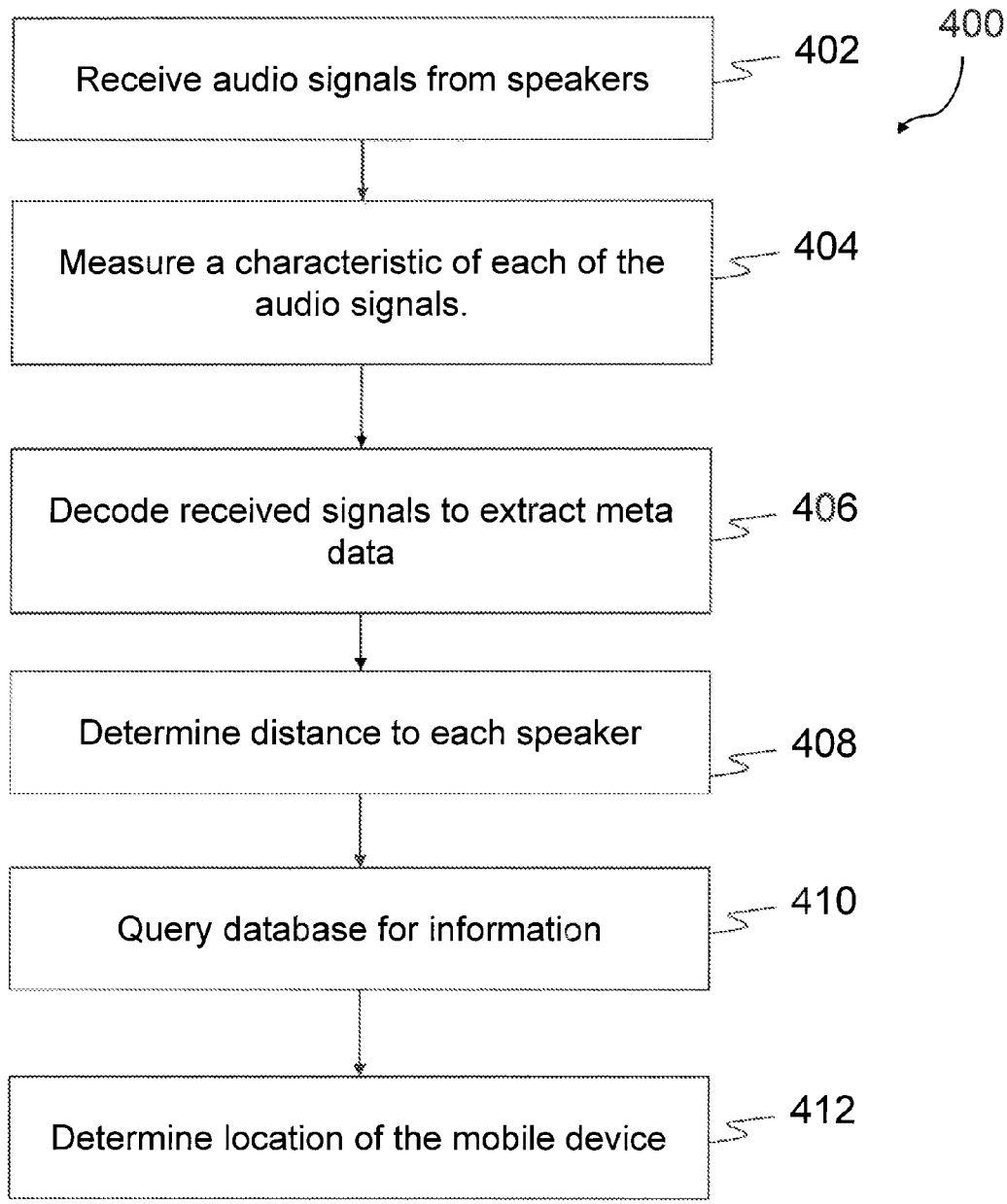
FIG. 4 is a flow chart illustrating another exemplary method for determining the location of a mobile device according to an embodiment.

An exemplary trilateration method for determining locations of a mobile device using distances determined using signal strength measurements will now be described with reference to FIGS. 1, 2, and 4. One of ordinary skill in the art will recognize that the operation of method 400 of FIG. 4 is not limited to location system 100 and speaker system 102, but that such systems are merely referred to herein as examples.

In an exemplary location determining method 400, audio signals are received from one or more speakers in block 402.

Each of one or more speakers transmits an audio signal having an audio frequency. The frequency of the audio signals may be chosen to be difficult for humans to hear. For example, most humans have difficulty hearing frequencies above 20 kHz. Selecting audio frequencies above 20 kHz may allow location determining system 100 to operate without presenting an auditory nuisance to personnel at a facility. Embodiments are not limited to using frequencies above 20 kHz, and audible frequencies may be employed. Embodiments using audible frequencies may transmit audio signals in pulses of brief duration to reduce or eliminate the generation of an audible nuisance.

In an embodiment, meta data is encoded and is incorporated into the audio signal prior to transmission from the speaker. For example, the meta data may be included in an audio signal using modulation techniques such as frequency, amplitude, or pulse width modulation.

Additionally, when multiple speakers are used, the speakers may be assigned to one of multiple frequency channels. Each frequency channel may be assigned a frequency, with the speakers assigned to each channel transmitting at the channel frequency. By assigning closely located speakers to different frequencies, cross talk and interference problems between the closely located speakers may be avoided. Speakers that are located sufficiently far apart so that they do not interfere acoustically with each other may be assigned to a common frequency channel.

In block 404 of method 400, a characteristic of the audio signals is measured. In an embodiment, the measured characteristic may be the signal strength of an audio signal as received by mobile device 104.

As may be appreciated from FIG. 1, audio signals may be received by, for example, microphone 108 of microphone system 106. Transducer 109 converts the audio signal to an electrical signal and provides the electrical signal to signal analyzer 110 of the microphone system. Signal analyzer 110 may calculate the signal strength of the received audio signals using a measurement of the electrical signal level generated by transducer 109.

The electrical signal generated by a microphone is generally a function of the frequency of the audio signal as well as the signal strength present at the microphone. In an embodiment, localization module 114 may be configured to frequency correct the signal strength determined by receiver 210 using information that describes the frequency response of the microphone. The frequency response information may be a characteristic of the particular microphone present in the mobile device. The frequency information for the microphone may be stored in a database on mobile device 104, or may be stored remotely on a server.

FIG. 6 shows an example data structure 600 that may be used to store microphone frequency response data, according to an embodiment. Data structure 600 in FIG. 6 may represent, for example, data stored in one or more tables in localization database 118. Data structure 600 includes several records 602a, 602b, and 602c, each holding frequency response data for a microphone. While data structure 600 shows several records, embodiments may include only a single record. For example, if data structure 600 is stored in a database on mobile device 104, a single record may be provided that holds only the data relevant for mobile device 104.

Each record 602 of data structure 600 may include one or more fields. For example, field 604 stores data identifying the microphone or mobile phone for which the remaining data in the record applies. Example field 606 stores data describing the frequency response for a given microphone in a mobile device. Accordingly, in cases where data structure 600 holds the data for multiple devices, the frequency response for a given microphone or mobile device may be retrieved by querying localization database 118 using information identifying the particular microphone or mobile device. For example, the localization database may generate a query to the database that includes the mobile device model number "N3287". Localization database 118 may respond to the query by returning field 606 from record 602c. The frequency response information in returned field 606 is then used by localization module 114 to correct the audio signal strength calculated from the electrical signal generated by transducer 109. Frequency response data for frequencies not included in the field 606 may be calculated from the returned data field 606 using interpolation or extrapolation.

Referring again to FIG. 4, in block 406 of method 400, received signals are decoded to extract meta data.

In an embodiment, signal analyzer 110 extracts digital data from received audio signals and decoder 112 extracts meta data from the digital data. For example signal analyzer 110 may demodulate an electrical signal to recover digital data, and decoder 112 may extract meta-data from the recovered digital data. The meta data may include information for determining one or more parameters for location determining system 100, such as the speaker location of the speaker transmitting the audio signal, the speaker's transmission frequency, and the signal strength for the audio signal transmitted by the speaker.

In an embodiment, the meta data may include speaker identification information that may be used to retrieve parameters of location determining system 100 parameters, and location module 114 may be configured to retrieve the parameters by querying localization database 118 with the speaker identification information.

FIG. 7 shows an example data structure 700 used in an embodiment. In an embodiment, exemplary data structure 700 represents one or more tables that store speaker location information for one or more speakers in, for example, localization database 118. Each of the records 702a, 702b, 702c, and 702d of data structure 700 includes location information for one of the speakers of speaker system 102. Field 704 of each record includes information identifying the speaker for which the data in the remaining fields of each record applies. Accordingly, information for a particular speaker may be retrieved by querying the database with the speaker identification derived from the meta data included in the audio signal transmitted by the speaker.

In an embodiment, field 706 of each record of exemplary data structure 700 contains information describing the location of a speaker of speaker system 102 in location determination system 100. The location information may be provided in various forms. For example, field 706 of record 702a contains information describing the absolute location of the speaker with speaker identification (ID) 0000001 using terrestrial coordinates, namely longitude and latitude. In the illustrated example, the location information in field 706 of record 702a is the latitude and longitude of the speaker. On the other hand, field 706 of records 702b, 702c and 702d contain describing the relative location of a speaker within a facility. Field 706 of record 702b describes the location of speaker 0000002 as the North East ceiling corner of Conference Room 1. Field 706 of record 702c describes the location of speaker 0000003 as Conference room 4. Field 706 of record 702d describes the location of speaker 0000004 in X, Y, and Z coordinates relative to an origin point in a particular location of a facility. Using algorithms known in the art, absolute positions may be converted to relative positions, and relative positions may be converted to absolute positions when the location of the origin point is know. Descriptive locations may be converted to coordinates and locations specified in coordinates may be converted to descriptive locations by doing table look ups of information stored in localization database 118.

The meta data may also be used to retrieve other information for use in calculating the location of a mobile device. For example, the audio signal strength transmitted by a particular speaker, and the frequency of the audio signal transmitted by a speaker are contained in fields 708 and 710 respectively of data structure 700. Each of these speaker parameters may be retrieved by querying localization database 118 using a speaker identification retrieved from meta data present in the audio signal.

In field 710 of records 702a, 702b, and 702c, the frequencies of the speakers are specified directly in Hz. For record 702d, the channel number "1" is specified in field 710. The frequency in Hz for the speaker with speaker ID 0000004 may be retrieved by querying a table of localization database 118 that stores the channel frequencies assigned to each channel using the channel number retrieved from field 710 of record 702d.

In another embodiment, the meta data modulating the audio signal may directly include one or more parameters of location determining system 100 described above as being retrieved using the speaker identification. For each parameter of location determining system 100 that is included in meta data, steps for retrieving the directly included parameter by querying a database may be omitted.

In block 408 of exemplary location determining method 400, distances between the mobile device and one or more speakers is determined. In an embodiment, localization module 114 determines distances between each of one or more speakers 102a-d and mobile device 104. In an embodiment, a determination of the distance between a speaker and mobile device 104 is calculated using the transmitted audio signal strength and the strength of the audio signal received at mobile device 104. The ratio of the transmitted signal strength to the received signal strength is at least approximately a function of the location of the speaker relative to the location of mobile device 104. For example the transmitted audio signal may attenuate in an inverse square relationship with the distance between the speaker and the mobile device. Accordingly, localization module 114 may use the inverse square relationship to calculate the distances between mobile device 104 and each speaker of speaker system 102 using the known transmitted audio signal strength and the measured received audio signal strength for each speaker.

In the example trilateration determination illustrated in FIG. 5, regions of equal received audio signal strength are shown to lie on spheres 502a, 502b, and 502c surrounding speakers 102a, 102b, and 102c respectively. In embodiments, obstructions and reflections from objects within a facility may cause the audio signal strength to attenuate anisotropically. In other words, the attenuation of the audio signal with distance from the speaker may not conform to the inverse square law as described above and regions of equal signal strength may not be perfectly spherical. In an embodiment, the audio signal strength for each speaker expected at various locations in the building may be measured, and stored in a database.

Returning to FIG. 7, field 712 of data structure 700 contains measured signal strength data for each of the speakers obtained at various locations of a facility. For example, the signal strength data in field 712 can be obtained by traversing the facility with an instrument for measuring signal strength and tabulating the signal strength for each audio signal received, the identification of the speaker transmitting the respective audio signal, and the coordinates of the location at which the signal strength was measured.

In an embodiment, location module 114 can be configured to determine the pattern of attenuation of signal strength with distance for each speaker of the speaker system by retrieving the signal strength data stored in field 712 data structure 700 from localization database 118. Location module 114 can determine the distance from a respective speaker to mobile device 104 by comparing the retrieved signal strength attenuation pattern for the respective speaker to the measured signal strength for the speaker at mobile device 104.

In a further embodiment, location module 114 can determine a location for mobile device 104 by retrieving facility signal strength information stored in data structure 700, and identifying a location at which the retrieved facility signal strength data most closely matches the signal strengths measured at mobile device 104 as the location of mobile device 104.

Referring again to FIG. 4, in block 410 of method 400, the location information database is queried. For example, one or more parameters of a location determining system may be retrieved by querying a database.

In an embodiment, localization module 114 may query localization database 118 for information used to determine the location of the mobile device in a facility. As has been discussed above, location module 114 may query localization database 118 for information such as the absolute or relative locations of one or more speakers of speaker system 102, transmitted signal strength and frequency information for each speaker, and the origin point for relative locations within the facility. Localization database 118 may store additional information such as any algorithms and/or information needed to calculate distances from the speakers to the mobile device. For example, localization database 118 may store information specifying that distances will be determined using trilateration using audio signal strength measurements.

In block 412 of method 400, the location of the mobile device is determined.

In an embodiment, localization module 114 determines the location of mobile device 104. Localization module 114 may calculate coordinates of the location of mobile device 104 using one or more of the calculated distances to the speakers of speaker system 102. Once the coordinates have been calculated, the location of mobile device 104 may be shown on display 124 of mobile device 104 and/or on a remote display. The location may be displayed in various formats. For example, the coordinates may be displayed on a map of the facility. Alternatively, the coordinates may be converted into a descriptive location such as "Conference Room 1" or "Men's Wear Department."

IV. Trilateration Using Audio Signal Timing Measurements

In an embodiment, a location for a mobile device may be determined by a trilateration method that uses audio signal timing measurements to determine distances between the mobile device and one or more speakers. The trilateration method using audio signal timing differs from the trilateration method described above using audio signal strength measurements principally in the method used to determine distances. Accordingly, only a brief description of aspects that are similar to aspects of the exemplary signal strength method will be provided.

Embodiments employing trilateration using audio signal timing measurements will be now described with reference to FIGS. 1, 2, and 4. FIG. 4 illustrates a flowchart of an exemplary method 400, according to an embodiment. One of ordinary skill in the art will recognize that the operation of method 400 is not limited to location determining system 100 and speaker system 102, but that such systems are merely referred to herein as examples.

In location determining method 400, audio signals are received from one or speakers in block 402.

As discussed above, each of one or more speakers of speaker system 102 transmits an audio signal having an audio frequency. The speakers may be arranged in frequency channels as discussed above. Meta data is encoded and is incorporated into the audio signal prior to transmission from the speaker. For example, the meta data may be included in the audio signal using any modulation technique such as frequency, amplitude or pulse width modulation. The speakers may be arranged in frequency channels as describe above.

In block 404 of method 400, a characteristic of the audio signals is measured.

In an exemplary embodiment, the characteristic of the audio signals can be the time of arrival of the audio signal at a mobile device. As may be appreciated from FIG. 1, audio signals may be received by, for example, transducer 109 of microphone system 106. Transducer 109 converts the audio signal to an electrical signal and provides the electrical signal to signal analyzer 110 of the microphone system. Signal analyzer 110 generates an output signal that is representative of the time of flight of the audio signal between a respective speaker of speaker system 102 and mobile device 104.

Receiver 210 may determine the time of arrival of an audio signal by referring to an internal time standard included in mobile device 104 at the time signal analyzer 110 detects an electrical signal from transducer 109. In an embodiment of the invention, location module 114 can verify that the audio signal was transmitted by a speaker of speaker system 102 may verifying that the audio signal contains meta data.

Referring again to FIG. 4, in block 406 of method 400, received signals are decoded to extract meta data.

In an embodiment, decoder 112 recovers the meta data contained in the audio signals received from one or more speakers by decoding the digital data extracted from signals by signal analyzer 110. The meta data may include information for determining one or more parameters for location determining system 100, such as speaker locations, speaker transmission frequencies, and the time stamp information that describes the time of transmission of an audio signal.

In an embodiment, the meta data may include speaker identification information that may be used to retrieve parameters associated with location determining system 100. As discussed above with reference to FIG. 7, speaker data and other system parameters may be retrieved by querying localization database 118 using the speaker identification information.

In an embodiment, the meta data included in an audio signal may include one or more parameters of location determining system 100. For example, the meta data may include a time stamp indicating the time of transmission of an audio signal by a respective speaker. The meta data may also include coordinates for the location of the respective speaker. For each parameter of location determining system 100 included in the meta data, steps for retrieving the directly included parameter by querying a database may be omitted.

In block 408 of an embodiment of method 400, a distance to each speaker is determined.

In an embodiment, location module 114 determines the distances between each of one or more speakers of speaker system 102 and mobile device 104, from the time of flight for audio signals traveling between the one or more speakers. The time of flight may be calculated by subtracting the time of transmission of the audio signal by a speaker from the time of arrival of the audio signal at mobile device 104 provided that synchronization issues between time standards for the speakers and the mobile device are addressed. Localization module 114 may calculate the distances between each speaker of speaker system 102 and mobile device 104 by multiplying the flight travel time of the audio signal by the speed of sound. The speed of sound in air is approximately 340 meters per second.

Referring again to FIG. 4, in block 410 of method 400, a database of location information is queried. For example, one or more parameters of a location determining system may be retrieved by querying a database.

In an embodiment, localization module 114 may be configured to query localization database 118 for information used to determine the location of mobile device 104 within the facility. As has been discussed above, localization database 118 may be queried for information such as the absolute or relative locations of one or more speakers of speaker system 102 and the origin point for relative locations within the facility. Additionally, localization database 118 may store information such as algorithms and/or information needed to calculate distances from the speakers to the mobile device. For example, localization database 118 may information specifying that locations will determined using trilateration using audio signal timing measurements.

In block 412 of method 400, the location of the mobile device is determined. In an embodiment, localization module 114 determines the location of mobile device 104 using time of flight information to determine the distances between speakers and mobile device 104. For example, localization module 114 may calculate coordinates of the location of mobile device 104 using one or more of the determined distances to the speakers of speaker system 102. Once the coordinates have been calculated, the location of mobile device 104 may be shown on display 124 of mobile device 104 and/or on a remote display as previously described.

As mentioned above, the accuracy of the synchronization of clocks in location determining system 100 affects the accuracy with which positions may be determined when determining distances using time of flight. In particular, when determining distances using one or two speakers, synchronization between time standards used to generate the time stamp indicating transmission by the speaker and time standards used at the mobile device may be performed. On the other hand, when three or more speakers are used to determine a location of the mobile device, the location may be calculated using a multilateration technique known to those skilled in the art that uses differences in times of flight between three or more synchronized transmitters and a receiving device to determine the location of the receiving. As multilateration uses differences in travel times between the transmitting speakers and the mobile device receiver to determine the location of the mobile device, synchronizing the time standards of the speakers of speaker system 102 is sufficient, and steps for synchronizing the mobile device time standard with other time standards used in the location determining system 100 may be omitted in an embodiment employing multilateration using differences in times of flight with three or more speakers.

As previously mentioned, the speed of sound is approximately 340 meters per second. Accordingly, positions may be determined to within a few meters if the time standards are synchronized to within about 10 milliseconds. Positions may be determined to accuracies of less than a meter if the time standards are synchronized to within about 1 millisecond.

Any method for synchronization of the time standard that produces the desired accuracy may be used.

Example synchronization methods will now be described with reference to FIG. 1. Speakers of speaker system 102 may be connected to localization server 122 via network 120. Localization module 114 may provide a single time standard for all of the speakers of speaker system 102 connected to localization server 122. For example, driver element 101 of each speaker of speaker system 102 may include a time standard that is periodically compared with a time standard present on the localization server 122, with the results of the comparison used to correct time stamps generated by the speakers of speaker system 102. Alternatively, the time stamps for all speakers of speaker system 102 may be generated by the localization server 122.

In an embodiment, synchronization of mobile device 104 with localization server 122 may be accomplished by transmitting time information from localization server 122 to mobile device 104 using network 120 and transceiver 116. Alternatively, the time standards of mobile device and localization server 122 and/or speakers may be compared to a time standard reachable through network 120. This alternative method allows synchronization of the time standard without exchanging timing information between localization server 122 and mobile device 104.

The accuracy of the time of flight determination methods depends on the accuracy with which the speed of sound is known. While the speed of sound through air is essentially independent of the frequency of the sound, the speed of sound does vary considerably with changes in the temperature of the air through which the sound travels. For example, the speed of sound in air is approximately 331.3 meters per second at 0° C. and 349.1 meters per second at 35° C. Accordingly, locations may be determined more accurately when the effect of air temperature on the speed of sound is taken into account. In an embodiment, air temperature may be measured using temperature sensors within the facility, and the measured temperature may be used to determine the speed of sound for use in location determinations using time of flight measurements.

In an exemplary embodiment, localization module 114 may determine the air temperature, and thus the speed of sound to be used in location calculations, by querying temperature sensors located in the facility via network 120. For example, the location module 114 may obtain temperature information by querying an air conditioning and heating system for the facility that is connected to location determining system 100 by network 120.

V. Determining Location by Comparing Received Signal Strengths

In an embodiment, the location of a mobile device is determined by measuring the audio signal strength received from a plurality of speakers. The location of the mobile device is then determined to be the location of the speaker with the highest audio signal strength measured at the mobile device.

Figure 3:
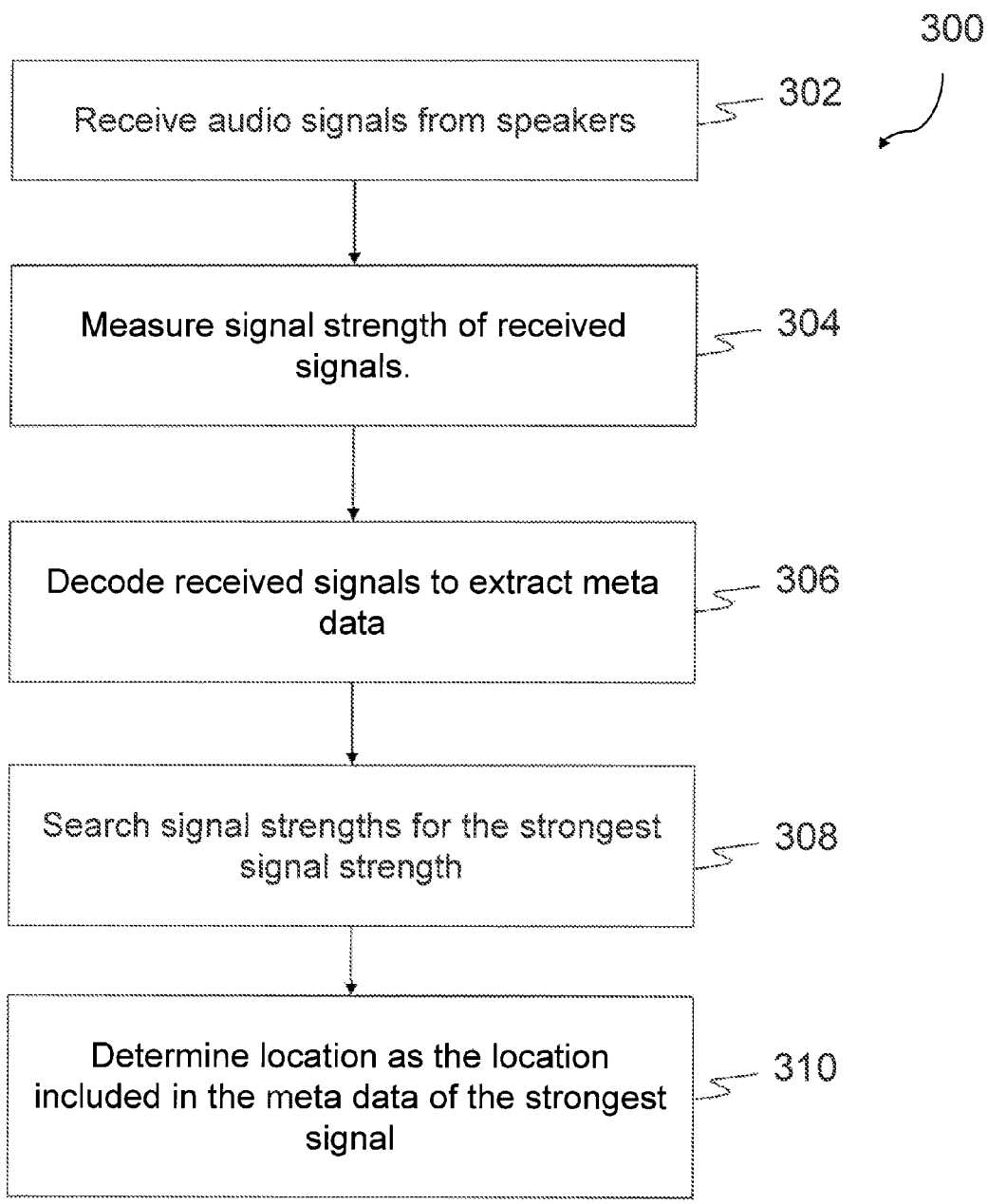
FIG. 3 is a flow chart illustrating an exemplary method for determining the location of a mobile device in an embodiment.

An exemplary method 300 for determining the location of a mobile device will be described with reference to FIGS. 1, 2, and 3. One of ordinary skill in the art will recognize that the operation of method 300 is not limited to location system 100 and speaker system 102, but that such systems are merely referred to herein as examples.

In exemplary location determining method 300, audio signals are received from one or more speakers in block 302.

In an embodiment, microphone 108 receives audio signals from one or speakers of speaker system 102. Each of one or more speakers of speaker system 102 may transmit an audio signal having an audio frequency. The frequencies of audio signals transmitted by the speakers may be assigned as described above with reference to FIG. 4. As previously described, speaker driver elements 101 may incorporate meta data into the audio signals.

In block 304 of exemplary method 300, the signal strengths of the received audio signals are measured.

In an embodiment, signal analyzer 110 generates an output signal representative of the signal strengths of the audio signals received at mobile device 104. As may be appreciated from FIG. 1, audio signals may be received by microphone 108 of microphone system 106. Transducer 109 converts the audio signal to an electrical signal and provides the electrical signal to signal analyzer 110 of the microphone system. Signal analyzer 110 may be configured to generate an output signal that is representative of the audio signal strength received by microphone 108.

As discussed above with reference to FIG. 4, signal analyzer 110 may provide a frequency correction to the measured strength of the audio signal. In addition, localization module 114 may calculate normalized audio signal strength values by taking into account the transmitted signal strength for an audio signal generated by a respective speaker.

Referring again to FIG. 3, in block 306 received signals are decoded to extract meta data.

In an exemplary embodiment of method 300, decoder 112 decodes meta data from the digital data extracted by signal analyzer 110 from received audio signals. The meta data may include information for determining one or more parameters for location determining system 100, such as speaker locations, speaker transmission frequencies, and speaker transmitted audio signal strengths.

In an embodiment, the meta data includes speaker identification information that may be used to retrieve parameters on location determining system 100. An exemplary method for retrieving the system parameters are similar to those methods discussed above with reference to FIG. 7.

In an embodiment, the speakers of speaker system 102 do not all transmit signals having the same signal strength, localization module 114 may normalize the measured signal strengths using the values of transmitted signal strengths for each speaker. The transmitted signal strength may be included in the meta data of the audio signal transmitted by the speakers of speaker system 102. Alternatively, the transmitted signal strength for a speaker may be obtained by querying localization database 118 using the speaker identification data recovered from the meta data by decoder 112. In an embodiment, the querying technique used to obtain the transmitted signal strength data is similar to the method described above with reference to FIG. 7.

In block 308 of exemplary method 300, the signals strengths are searched for the strongest signal strength.

In an embodiment, localization module 114 performs a search of the signal strengths to identify the speaker having the highest value for the received signal strength. In an embodiment, the search uses the measured values of audio signal strength determined by signal analyzer 110. Alternatively, the localization module may identify the speaker having the largest normalized signal strength value.

In block 310 of exemplary method 300, a location of the mobile station is determined as the location included in the meta data of the strongest signal.

In an embodiment, once the speaker having the highest signal strength has been identified using the search described in block 308, localization module 114 identifies the location of mobile device 104 as the location of the identified speaker. In an embodiment, localization database 118 may be queried for any information used to determine the location of mobile device 104 within the facility. As has been discussed above, localization database 118 may be queried for information such as the absolute or relative locations of the identified speaker. Alternatively, speakers of speaker system 102 may incorporate the location of the speaker in the meta data of their transmitted audio signals and decoder 112 may retrieve the location of the identified speaker from the meta data. Localization module 114 may be configured to identify the location of the identified speaker as the location of mobile device 104.

Once the location of mobile device 104 has been determined, the location of mobile device 104 may be shown on display 124 of mobile device 104 and/or on a remote display. The location may be displayed in various formats. For example, the coordinates may be displayed on a map of the facility. Alternatively, the coordinates may be converted into a descriptive location such as "Conference Room 1" or "Men's Wear Department."

VI. Example Computer System Implementation

Embodiments shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems.

Figure 8:
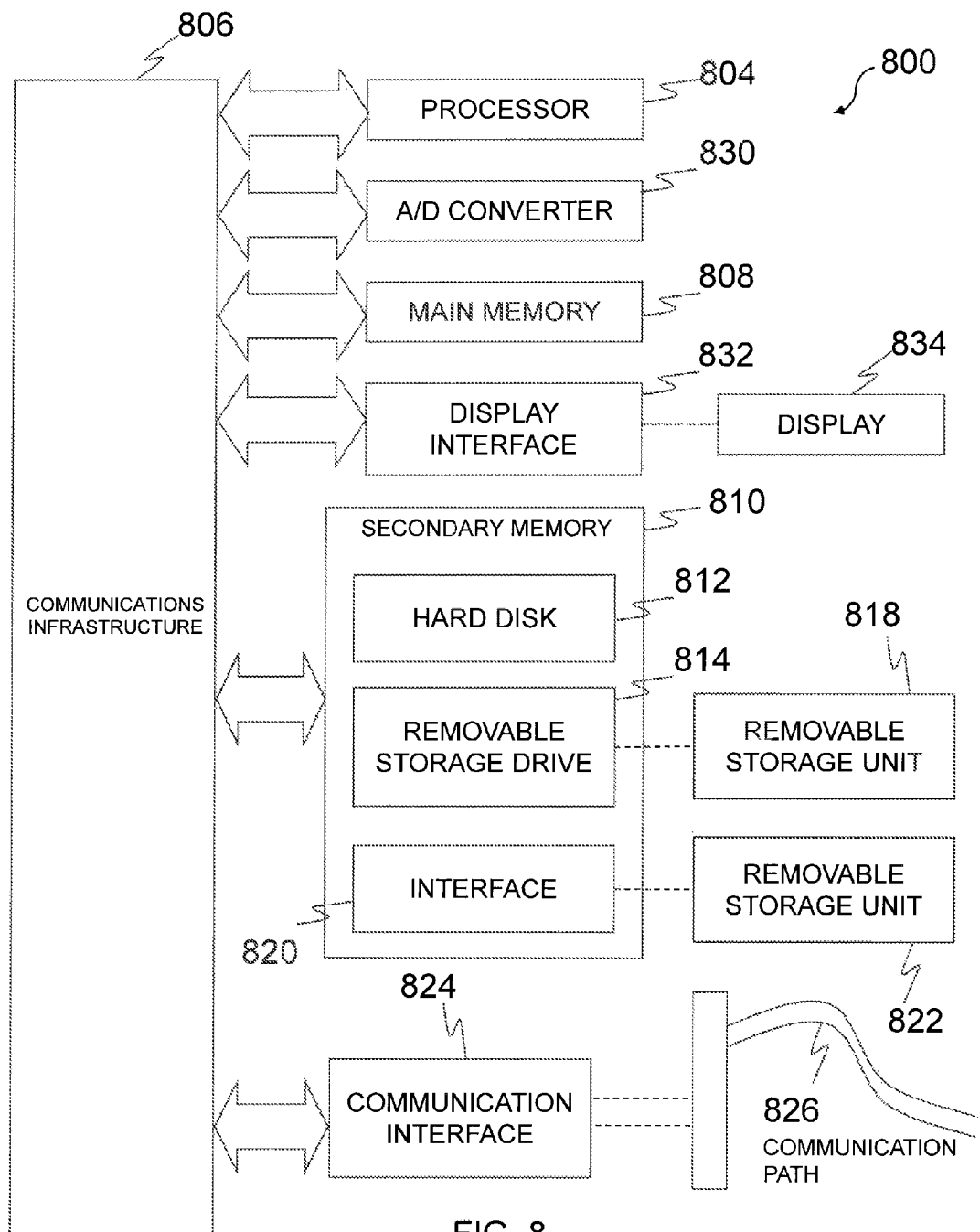
FIG. 8 is a block diagram of an example computer system in which embodiments may be implemented.

FIG. 8 illustrates an example computer system 800 in which embodiments, or portions thereof, may be implemented using computer-readable code. For example, localization module 114, transceiver 116, microphone system 106, and localization server 122 in FIG. 1 may be implemented in computer system 800 using hardware, software, firmware, tangible computer readable media having instructions stored thereon, or a combination thereof and may be implemented in one or more computer systems or other processing systems. Hardware, software, or any combination of such may form a portion of any of the modules and components in FIGS. 1-7.

If programmable logic is used, such logic may execute on a commercially available processing platform or a special purpose device. One of ordinary skill in the art may appreciate that embodiments of the disclosed subject mater may be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments are described in terms of this example computer system 800. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. Removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer readable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, a radio-frequency (RF) link or other communications channels.

Computer system 800 may also include an analog to digital converter 830. The analog to digital converter may receive analog signals from analog sensors and transducers, analog computers, or other devices that output analog signals and converts these signals into a digital representation that may be stored in memory or processed by processor device 804. Analog to digital converter 830 may be a separate device or may be incorporated into other components of computer system 800 such as processor device 804.

In this document, the terms "computer program medium" and "computer readable medium" are used to generally refer to storage media such as removable storage unit 818, removable storage unit 822, and a hard disk installed in hard disk drive 812. Computer program medium and computer readable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement embodiments as discussed herein. In particular, the computer programs, when executed, enable processor device 804 to implement the processes of embodiments, such as the stages in the methods illustrated by flowcharts 300 and 400 of FIGS. 3 and 4, respectively, discussed above. Accordingly, such computer programs represent controllers of the computer system 800. Where embodiments are implemented using software, the software may be stored in a computer program product and loaded into computer system 800 using removable storage drive 814, interface 820, and hard disk drive 812, or communications interface 824.

Computer system 800 may include a display interface 832 for interfacing a display unit 834 to computer system 800. Display unit 834 may be any device capable of displaying visually displayed information according to this invention, and compatible with display interface 832. Examples of suitable displays include liquid crystal display panel based device, cathode ray tube (CRT) monitors, organic light-emitting diode (OLED) based displays, and touch panel displays.

Embodiments also may be directed to computer program products comprising software stored on any computer useable medium. Such software, when executed in one or more data processing devices, causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

VI. Variations

As would be understood by a person skilled in the art based on the teachings herein, several variations of the above described features for calculating the location of a mobile device may be envisioned. These variations are within the scope of embodiments. For example, one skilled in the art may envision using triangulation in place of or in combination with the methods using trilateration described above.

Embodiments employing trilateration may use combinations of the methods described above for calculating distance measurements. For example, distances between speakers and a mobile device may be determined using time of flight measurements, audio signal strength measurements, or any combination of these techniques.

Triangulation involves using angle information to calculate locations. Angle information may be provided by using speakers that emit sound in defined direction rather than omni-directionally. For example, a speaker of speaker system 102 might include an array of sound emitting elements each of which emits sound in a different direction. Alternatively, a speaker may include only a single sound emitting element that may be operated to emit sound in various directions. The angle of sound emission may be coded into the audio signal emitted by the speaker emitter so that azimuth information may be provided to the localization unit for calculating positions.

In the descriptions given above, example methods in accordance with the invention, have been described as being executed by the hardware illustrated in FIGS. 1 and 2. These descriptions are by way of example only, and various hardware may be used to carry out the methods without departing from the present invention as contemplated by the inventor(s).

VII. Conclusion

The Summary and Abstract sections may set forth one or more but not all exemplary embodiments as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A mobile device, comprising:
 a microphone system, comprising:
  a microphone configured to receive audio signals from a plurality of sources;
  a transducer configured to transduce received audio signals into respective analog signals;
  a signal analyzer configured to measure at least one attribute of each of the analog signals and to convert each of the analog signals into a respective digital signal; and
  a decoder configured to decode the digital signals to recover meta-data from each of the digital signals, the meta data including at least a transmitted signal strength;
 a transceiver configured to interact with a server to obtain information describing each source of the received audio signals;
 a localization module configured to determine a strongest received signal based on the transmitted signal strengths;
 the localization module being further configured to determine a location of the source of the strongest received signal;
 the localization module being further configured to determine a location of the mobile device based on the at least one attribute of each of the analog signals, the determined location of the source of the strongest received signal, and the information describing each source of the received audio signals;
 a memory configured to store the information describing each source of the audio signals; and an interface configured to provide the location of the mobile device to a user.

2. A method of determining a location of a mobile device, comprising:
receiving, using one or more processors, a plurality of audio signals at the mobile device;
measuring, using the one or more processors, a characteristic of each audio signal, the characteristic including at least a received signal strength;
decoding, using the one or more processors, each audio signal to extract respective meta data, the meta data including at least a transmitted signal strength;
normalizing, using the one or more processors, the received signal strength using at least the transmitted signal strengths;
determining, using the one or more processors and based on the normalized signal strength, a strongest received signal;
determining, using the one or more processors, a location of a source of the strongest received signal; and
identifying, using the one or more processors, a location of the mobile device based on the identified location of the source.

3. The method of claim 2, wherein measuring comprises:
measuring a distance to the source of the of the strongest received signal.

4. The method of claim 3, wherein each meta data includes data indicative of a location of a speaker that transmitted a respective one of the audio signals.

5. The method of claim 3, wherein determining comprises:
setting the location of the mobile device to be the location associated with the audio signal with the strongest received signal strength.

6. The method of claim 2, wherein each of the meta data includes data indicative of an identifier that identifies a speaker used to transmit the respective audio signal.

7. The method of claim 6, further comprising determining a distance from the mobile device to each speaker.

8. The method of claim 7, wherein determining the distance comprises calculating the distance from the mobile device to each of the speakers using the received signal strengths, a characteristic of each speaker, and a characteristic of the mobile device.

9. The method of claim 8, wherein determining the distance further comprises querying a database with the identifiers to obtain the characteristic of each speaker.

10. The method of claim 8, wherein the characteristic of the mobile device is a frequency response of the mobile device.

11. The method of claim 6, wherein each meta data includes data indicative of a time at which the respective audio signal was transmitted and determining the distance comprises determining a time of flight for each of the audio signals.

12. The method of claim 6, further comprising:
querying a database to map each of the identifiers to a respective location.

13. A system for determining a location of a mobile, the system comprising:
one or more processors;
memory coupled to the one or more processors;
a microphone that receives at least one audio signal output by at least one speaker;
a signal analyzer, coupled to the microphone, that measures a characteristic of each received audio signal, the characteristic including at least a received signal strength, each speaker generating a respective audio signal; and
a decoder that decodes each received audio signal to extract respective meta data, the meta data including at least a transmitted signal strength;
wherein the one or more processors are configured to:
normalize the received signal strengths using at least a transmitted signal strength;
determine, based on the normalized signal strength, a strongest received signal;
determine a location of the speaker of the strongest received signal; and
identify a location of the mobile device based on the identified location of the speaker.

14. The system of claim 13, wherein each meta data includes data indicative of a location of a speaker used to transmit the respective audio signal, and the one or more processors set the location of the mobile device as the location associated with a received audio signal having the strongest received signal strength.

15. The system of claim 13, wherein the one or more processors determine a distance from the mobile device to each speaker.

16. The system of claim 15, wherein the determining the distance from the mobile device to each speaker is based on the received signal strengths, a characteristic of the mobile device, and a characteristic of each speaker.

17. The system of claim 16, wherein the one or more processors query a database to obtain the characteristic of the mobile device and the characteristic of each speaker.

18. The system of claim 15, wherein the characteristic of each received audio signal is the time at which each received audio signal is transmitted and the one or more processors is are configured to determine the distance from the mobile device to each speaker by determining the time of flight for each received audio signal.

* * * * *